(12) United States Patent
Li et al.

(10) Patent No.: US 6,879,746 B2
(45) Date of Patent: Apr. 12, 2005

(54) MINIATURE 2×2 MAGNETO-OPTIC SWITCH

(75) Inventors: Shifang Li, Pleasanton, CA (US); Qing Shao, Santa Clara, CA (US)

(73) Assignee: Oplink Communications, Inc., Fremont, CA (US)

( * ) Notice: Subject to any disclaimer, the term of this patent is extended or adjusted under 35 U.S.C. 154(b) by 181 days.

(21) Appl. No.: 10/280,308

(22) Filed: Oct. 25, 2002

(65) Prior Publication Data

US 2004/0081387 A1 Apr. 29, 2004

(51) Int. Cl.[7] .................................................. G02B 6/26
(52) U.S. Cl. ............................. 385/16; 385/31; 385/11
(58) Field of Search .............................. 385/24, 27, 34, 385/11, 16, 31; 359/494–496

(56) References Cited

U.S. PATENT DOCUMENTS

| | | | | |
|---|---|---|---|---|
| 5,111,315 A | * | 5/1992 | Ledebuhr | 349/5 |
| 5,574,595 A | * | 11/1996 | Kurata et al. | 359/484 |
| 5,574,596 A | * | 11/1996 | Cheng | 359/484 |
| 5,594,821 A | * | 1/1997 | Cheng | 385/24 |
| 5,640,516 A | * | 6/1997 | Iwatsuka et al. | 359/280 |
| 5,909,310 A | * | 6/1999 | Li et al. | 359/484 |
| 5,982,539 A | * | 11/1999 | Shirasaki | 359/484 |
| 6,445,499 B1 | * | 9/2002 | Chang et al. | 359/484 |
| 6,493,139 B1 | * | 12/2002 | Liu et al. | 359/484 |
| 6,711,310 B1 | * | 3/2004 | Chang et al. | 385/11 |
| 2001/0053022 A1 | * | 12/2001 | Tai et al. | 359/484 |
| 2002/0141034 A1 | * | 10/2002 | Hu et al. | 359/281 |
| 2003/0007244 A1 | * | 1/2003 | Liu et al. | 359/484 |
| 2003/0030793 A1 | * | 2/2003 | Bastue et al. | 356/153 |
| 2003/0068112 A1 | * | 4/2003 | Jin et al. | 385/11 |
| 2003/0147136 A1 | * | 8/2003 | Pan et al. | 359/484 |

* cited by examiner

*Primary Examiner*—Ellen E. Kim
(74) *Attorney, Agent, or Firm*—Fish & Richardson P.C.

(57) ABSTRACT

A magneto-optical switch includes a first birefringent crystal configured to receive a light beam, a first half-wave compensator plate pair configured to receive split light beams from the birefringent crystal, a first Faraday rotator configured to receive the split light beams from the first half-wave compensator plate pair, and a beam splitter configured to receive the split light beam from the Faraday rotator. The first Faraday rotator is configured to change the polarization of a light beam passing through the first Faraday rotator.

28 Claims, 4 Drawing Sheets

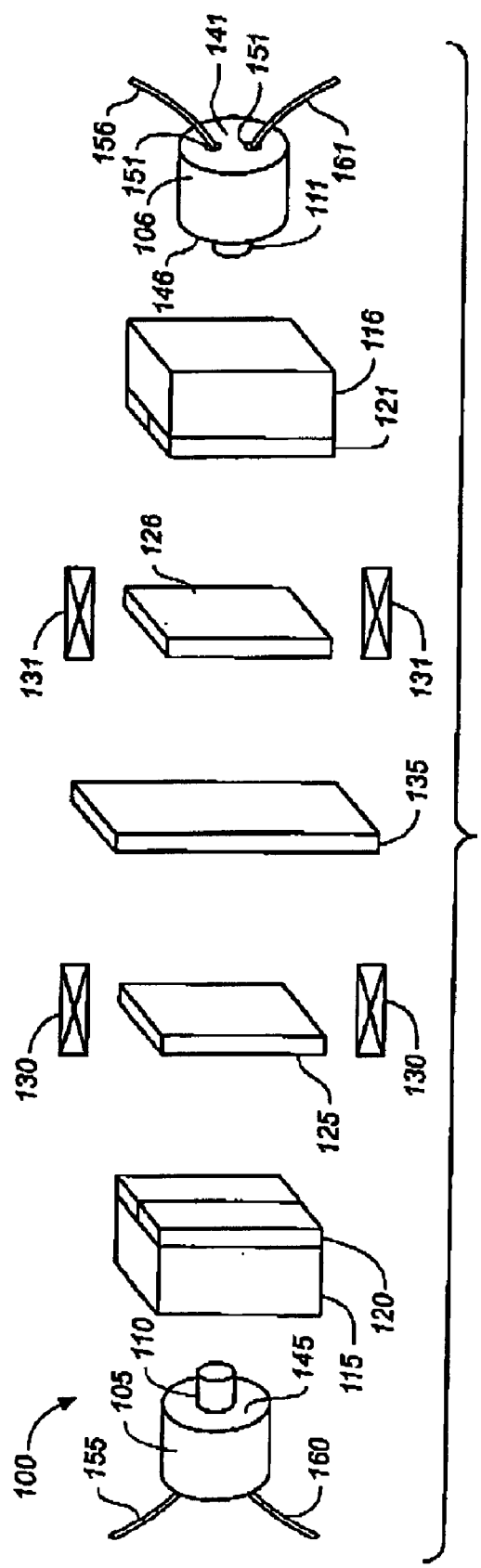
FIG._1
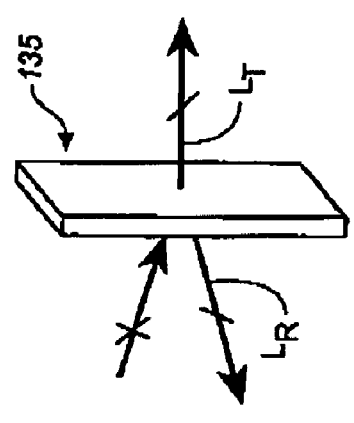
FIG._3
FIG._2

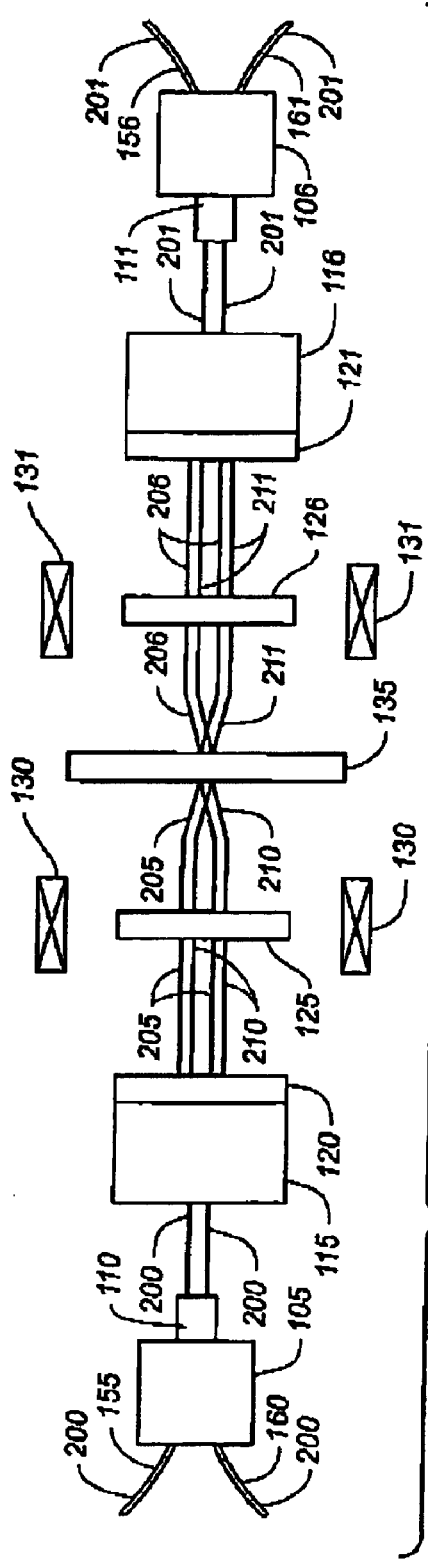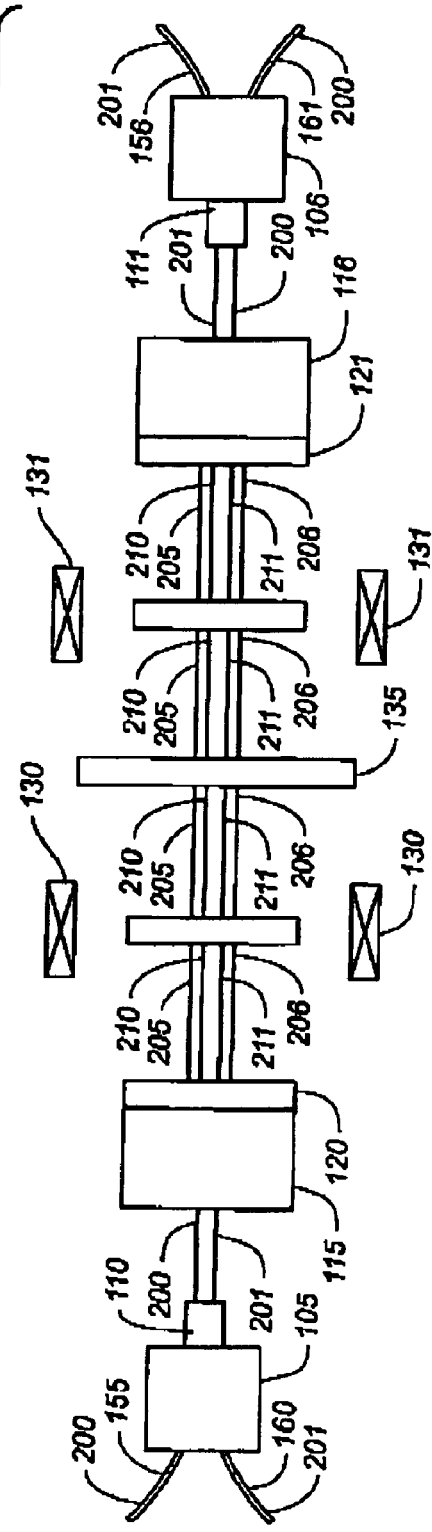

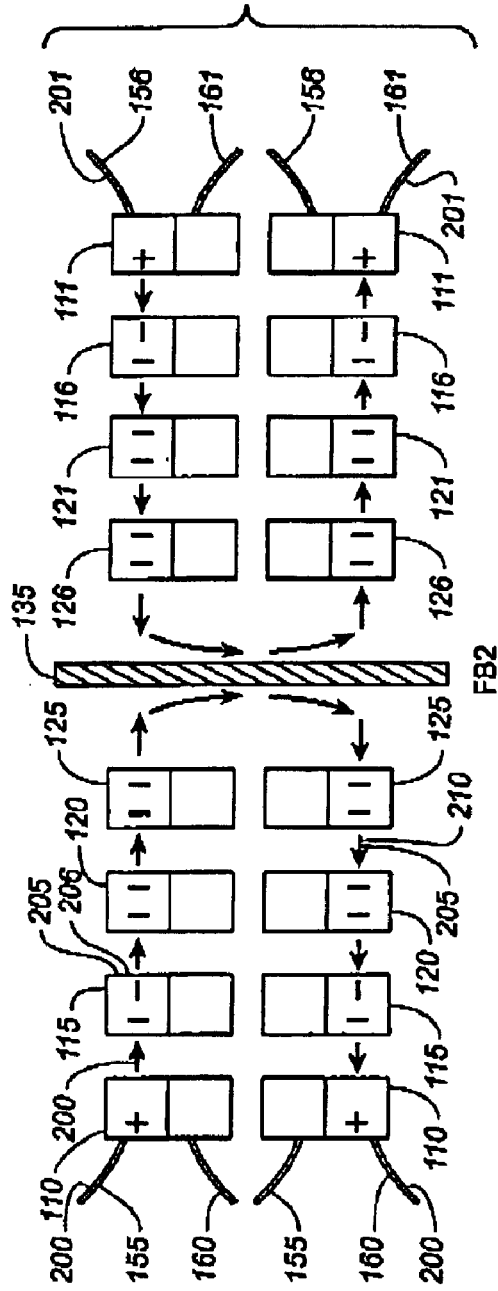
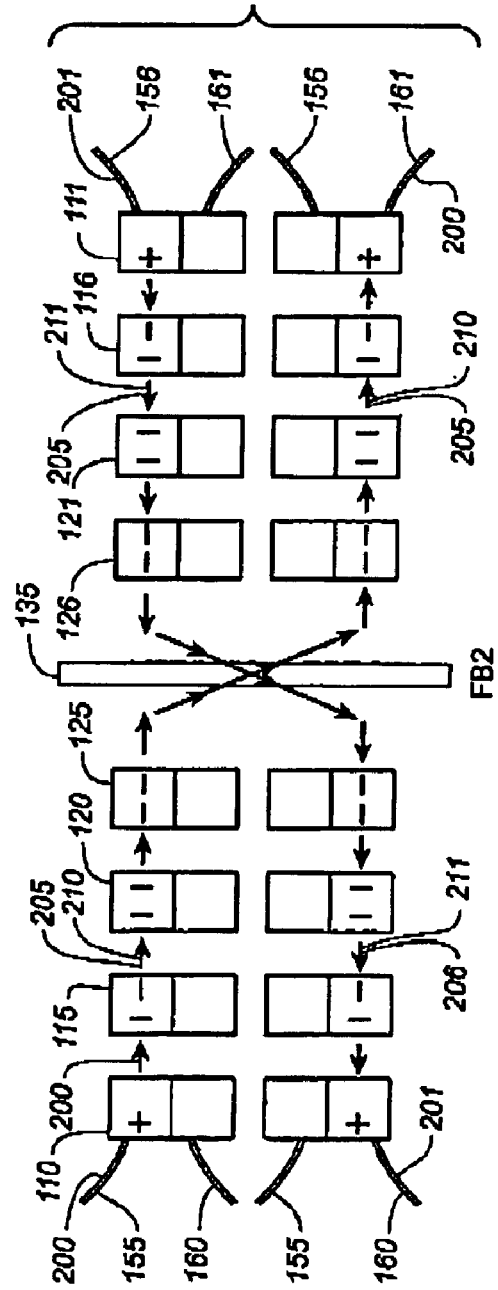

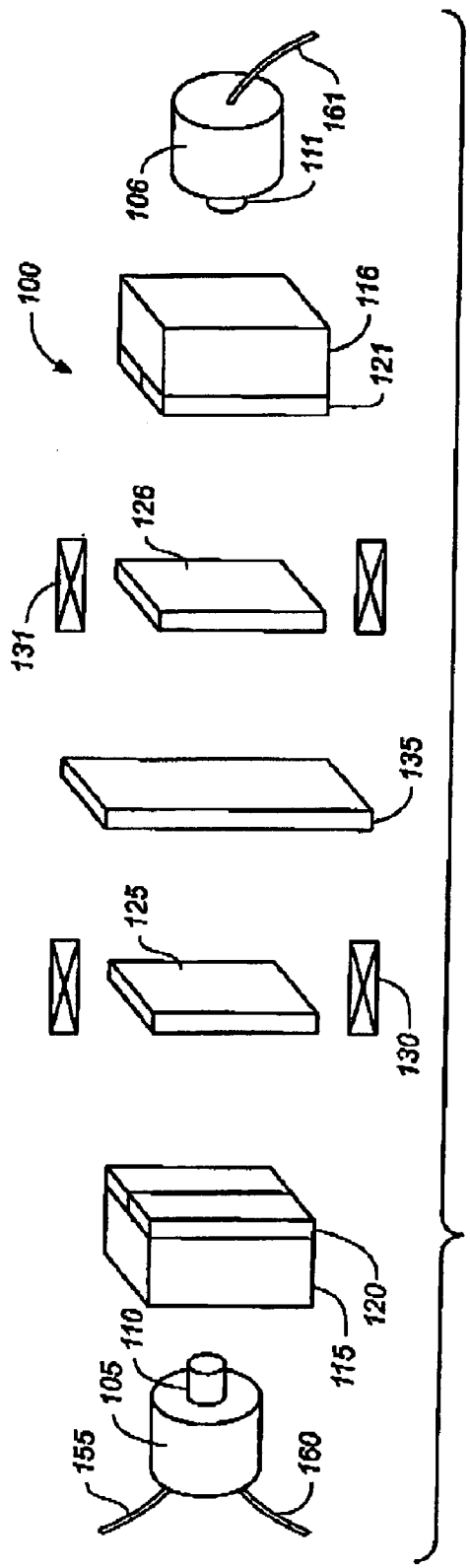
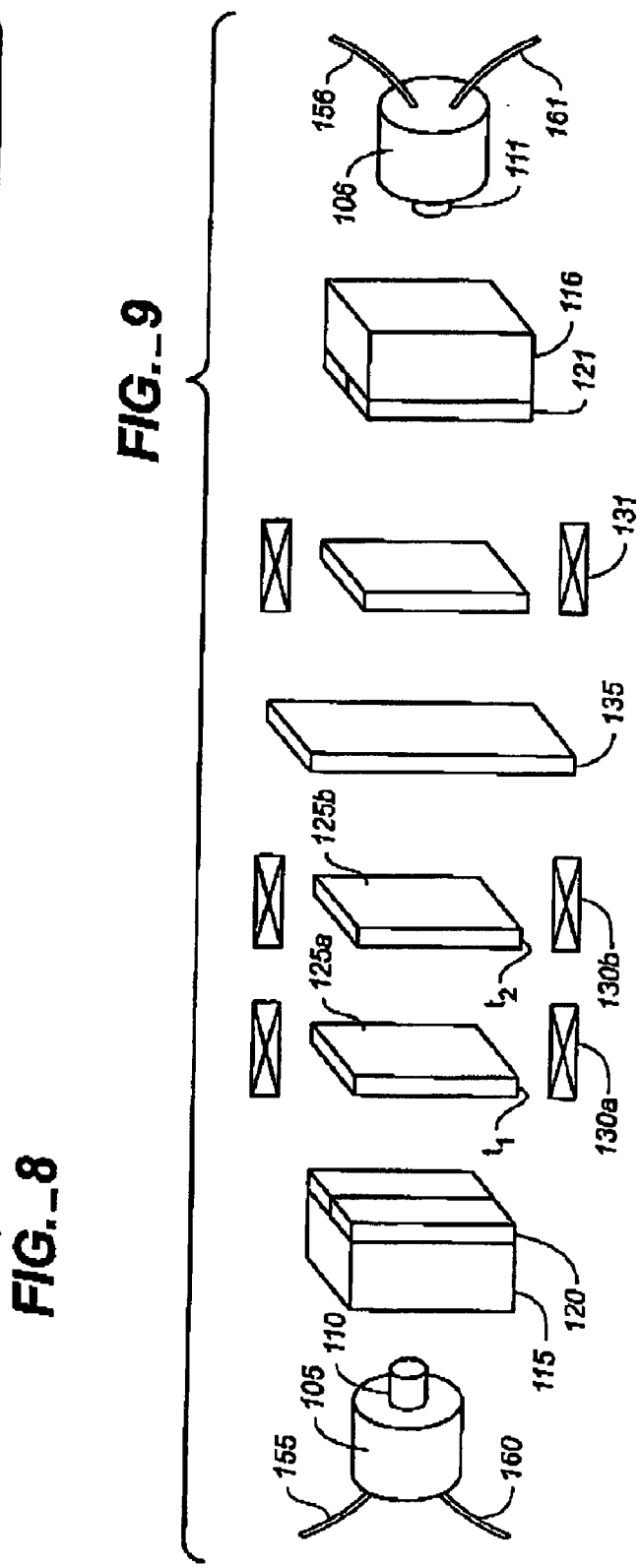

MINIATURE 2×2 MAGNETO-OPTIC SWITCH

TECHNICAL FIELD

This invention relates generally to optical technology, and more particularly to magneto-optical switches.

BACKGROUND

Optical switches are used in optical systems to switch a light beam between one or more input fibers and one or more output fibers. For example, optical switches are used in optical communication systems to connect and disconnect transmission paths to route light beams modulated with information, provide network protection, provide cross connection, and for add/drop applications. Optical switches also can be used to pulse a light source, e.g., a laser, or perform other functions with modulated or unmodulated light beams.

One type of optical switch is a 1×2 optical switch, which provides optical switching between one input port and two output ports. It is known that 1×2 optical switches using refractive optics are very reliable, have small insertion loss, and are easy to manufacture. The 1×2 optical switch has been used widely in the telecommunications industry, such as for protection switching, tag switching, etc. The 1×2 optical switch also has been used to build larger dimension switches, such as 1×4 and 1×8 optical switches. In some cases, the application needs to integrate multiple 1×2 optical switches together to reduce power consumption and/or physical space used. Another type of optical switch is the 2×2 optical switch, which provides optical switching between two input ports and two output ports. Unlike most 1×2 switches, which have low switch cycles, most 2×2 switches that are used for cross-connections or add/drop applications require much higher durability and reliability.

There are many technologies used to implement these switches, such as mechanical, electro-optic, thermo-optic, acousto-optic, magneto-optic and semiconductor technologies. Each switching technology has advantages and disadvantages. For example, mechanical switches are the most widely used routing components and provide very low insertion loss and cross-talk characteristics. However, the switching times of mechanical switches are limited to the millisecond range and the devices themselves are bulky. Moreover, if motor-driven parts are used to operate the switch, the switch will have a limited operative lifetime and may suffer from reliability issues.

SUMMARY

In one general aspect, a magneto-optical switch includes a first birefringent crystal configured to receive a light beam, a first half-wave compensator plate pair configured to receive split light beams from the birefringent crystal, a first Faraday rotator configured to receive the split light beams from the first half-wave compensator plate pair, and a beam splitter configured to receive the split light beam from the Faraday rotator. The first Faraday rotator is configured to change the polarization of a light beam passing through the first Faraday rotator.

Embodiments of the switch may include one or more of the following features. For example, the switch may include a second birefringent crystal, a second half-wave compensator plate pair, and a second Faraday rotator. The second birefringent crystal is coupled to the second half-wave compensator plate pair, the second half-wave compensator is plate pair is coupled to the second Faraday rotator, and the second Faraday rotator is coupled to the beam splitter The switch may further include a port coupled to the first birefringent crystal and configured to receive optical fibers and two fibers may be mounted in the port. The switch may further include a lensing element configured to receive a light beam from the port and the birefringent crystal receives the light beam from the lensing element.

The first birefringent crystal may be configured to separate a beam of light into two polarized beams. The first half-wave compensator plate pair may be configured to cause the split light beams passing through the first half-wave compensator plate pair to have the same polarization state. The first Faraday rotator may be configured to change the polarization state of the split light beams by substantially 90 degrees.

The beam splitter may include an axis of incidence and be configured to reflect light beams if the polarization of the light beams is perpendicular to the axis of incidence and transmit light beams if the polarization of the light beams is parallel to the axis of incidence.

The beam splitter may be a parallel plate polarizing beam splitter. The switch may further include an electromagnet coupled to the first Faraday rotator and configured to apply an electromagnetic field to the first Faraday rotator to change a polarization of a light beam directed through the first Faraday rotator.

The switch may further include a first port coupled to a first input optical fiber and a first output optical fiber, and a second port coupled to a second input optical fiber and a second output optical fiber. A light beam is directed between the first input optical fiber and the first output optical fiber when the electromagnetic field is applied and between the first input optical fiber and the second output optical fiber when the electromagnetic field is removed. The light beam may be directed between the second input optical fiber and the second output optical fiber when the electromagnetic field is applied and between the second input optical fiber and the first output optical fiber when the electromagnetic field is removed.

The switch may further include a first port coupled to a first input optical fiber and a first output optical fiber, and a second port coupled to a second input optical fiber and a second output optical fiber. A light beam is directed between the first input optical fiber and the first output optical fiber when the electromagnetic field is removed and between the first input optical fiber and the second output optical fiber when the electromagnetic field is applied. The light beam is directed between the second input optical fiber and the second output optical fiber when the electromagnetic field is removed and between the second input optical fiber and the first output optical fiber when the electromagnetic field is applied.

The first Faraday rotator may be configured to change the polarization of the light beams by a first amount when a first electromagnetic field is applied and by a second amount when a second electromagnetic field is applied.

In another general aspect a pair of light beams are switched between a first optical output port and a second optical output port. Switching the light beams includes providing a light beam, passing the light beam through a birefringent crystal, passing split light beams from the birefringent crystal through a half-wave compensator plate pair, passing the split light beams from the half-wave compensator plate pair through a Faraday rotator, and passing the split light beams from the Faraday rotator to a beam splitter. The Faraday rotator is configured to change the polarization angle of the split light beams as they pass through the Faraday rotator.

Embodiments of switching the light beams may include one or more of the following features. For example, switching may further include applying an electromagnetic field to the Faraday rotator so as to change a polarization angle of the beams in the Faraday rotator such that the polarization of the beams is parallel to an axis of incidence of the beam splitter. Switching may further include removing an electromagnetic field applied to the Faraday rotator so as to change a polarization angle of the beams in the Faraday rotator such that the polarization of the beams is parallel to an axis of incidence of the beam splitter. Switching may still further include changing an electromagnetic field applied to the Faraday rotator from a first field strength to a second field strength so as to change a polarization angle of the beams in the Faraday rotator such that the polarization of the beams is parallel to an axis of incidence of the beam splitter.

Switching may further include transmitting the split light beams through the beam splitter, directing the split light beams from the beam splitter through a second Faraday rotator, directing the split light beams from the second Faraday rotator through a half-wave compensator plate pair, and directing the split light beams from the half-wave compensator plate pair through a birefringent crystal. Switching may then include directing the split light beams from the birefringent crystal through a lensing element to combine the light beams into a combined beam and focus the combined beam into the second optical output port.

Switching may further include providing a second light beam, directing split light beams from a second birefringent crystal through a second half-wave compensator plate pair, directing the split light beams from the second half-wave compensator plate pair through a second Faraday rotator, and directing the split light beams from the second Faraday rotator to the beam splitter. The second Faraday rotator is configured to receive an electromagnetic field to change the polarization angle of the split light beams as they pass through the second Faraday rotator. Switching may further include applying an electromagnetic field so as to change a polarization angle of the split light beams in the second Faraday rotator such that the polarization of the split light beams is parallel to an axis of incidence of the beam splitter, whereby the split light beams are transmitted through the beam splitter.

Switching may further include directing the split light beams from the beam splitter through the first Faraday rotator, directing the split light beams from the second Faraday rotator through the first half-wave compensator plate pair, and directing the split light beams from the first half-wave compensator plate pair through the first birefringent crystal. Switching may further include directing the split light beams through a first focus lens to combine the split light beams into a second combined beam and-focusing the second combined beam into the first optical output port.

The beam splitter may be a parallel plate polarizing beam splitter. Applying an electromagnetic field may include supplying power to an electromagnet to apply the electromagnetic field. Removing an electromagnetic field may include ceasing the supply of power to an electromagnet that applies the electromagnetic field. Changing an electromagnetic field may include changing the amount of power supplied to an electromagnet that applies the electromagnetic field.

This invention can provide a reliable 2×2 optical switch by eliminating moving parts. The new invention allows one to build 2×2 optical switches with excellent optical performance, high switch speed, and compact size.

The details of one or more embodiments of the invention are set forth in the accompanying drawings and the description below. Other features and advantages of the invention will be apparent from the description, the drawings, and the claims.

DESCRIPTION OF DRAWINGS

FIG. 1 is a perspective side view of the optical components of a magneto-optic switch.

FIG. 2 is an end view of a port of the switch of FIG. 1.

FIG. 3 illustrates the reflectance and transmission of light by a parallel plate polarizing beam splitter.

FIG. 4 is a perspective side view of the optical components of the switch of FIG. 1 used to direct a light beam between a first pair of fibers and a second pair of fibers.

FIG. 5 depicts the rotation of the light beam as it passes through the switch of FIG. 4.

FIG. 6 is a perspective side view of the optical components of the switch of FIG. 1 used to direct a light beam between a third pair of fibers and a fourth pair of fibers.

FIG. 7 depicts the rotation of the light beam as it passes through the switch of FIG. 6.

FIG. 8 is a perspective side view of the optical components of the switch of FIG. 1 operated as a 1×2 switch.

FIG. 9 is a perspective side view of the optical components of a switch having a pair of Faraday rotators.

Like reference symbols in the various drawings indicate like elements.

DETAILED DESCRIPTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principles herein may be applied to other embodiments. Thus, the present invention is not intended to be limited to the embodiments shown, but is to be accorded the widest scope consistent with the principles and features described herein.

The present invention will be described in terms of particular optical switches having specific components having a specific configuration. Similarly, the present invention will be described in terms of particular optical switch components having specific relationships, such as distances or angles between components. However, one of ordinary skill in the art will readily recognize that this method and system will operate effectively for other components having similar properties, other configurations, and other relationships between components.

FIG. 1 shows an arrangement of the optical components in a magneto-optic fiber-optic switch 100 (hereinafter, switch 100). Switch 100 advantageously does not have moving parts, provides good optical performance, has a high switch speed, and can be implemented in a small size. Switch 100 includes first and second ports 105, 106, first and second lensing elements 110, 111, first and second birefringent crystals 115, 116, first and second half-wave plate and compensator plate pairs 220, 121, first and second Faraday rotators 125, 126, first and second electromagnets 130, 131, and a beam splitter 135. Beam splitter 135 can be a parallel plate polarizing beam splitter. Beam splitter 135 is optically if not physically, centered in switch 100 such that the components of switch 100 are arranged in the same configuration on each side of beam splitter 135. Each side of switch 100 includes, in sequential order a port, a lensing element, a birefringent crystal, a half-wave plate and compensator plate pair, and a Faraday rotator that is surrounded by an electromagnet. Because a description of the components on one side of beam splitter 135 is equally applicable to the components on the opposite side of beam splitter 135, the arrangement and the characteristics of the components of only one side are described below.

Referring also to FIG. 2, port 105 includes a first face 140 and a second face 145. First face 140 includes one or more bores or holes 150 for receiving optical fibers. Similarly, port 106 includes a first face 141, a second face 146, and one or more holes 151 for receiving optical fibers. Ports 105, 106 can be holders, glass capillaries, or pigtails. An input fiber 155 and an output fiber 160 are inserted into bores 150 in port 105 and an input fiber 156 and an output fiber 161 are inserted into bores 151 in port 106. Input fibers 155, 156 carry input light beams and output fibers 160, 161 carry output light beams. As described in more detail below, switch 100 is used to switch a first input light beam carried in input fiber 155 between output fibers 160, 161 while simultaneously switching a second input light beam carried in input fiber 156 between output fibers 161, 160.

Lensing element 110 is positioned in front of the second face 145 of port 105 such that lensing element 110 focuses an input light beam into the core of output fiber 160 and collimates an output light beam from input fiber 155. Lensing element 110 can be implemented as a graded index ("GRIN") lens, collimator, or focus lens.

Birefringent crystal 115 (hereinafter, crystal 115) is positioned in front of lensing element 110. Crystal 115 is constructed from a birefringent material, such as calcite, that divides or separates a light beam into two orthogonally polarized beams or rays: an ordinary ray having a refractive index, $n_o$, and an extraordinary ray having a refractive index, $n_e$. Because the crystal 115 is a reciprocal device, if light beams are directed back through the crystal along the same path, they are combined into a single, combined light beam.

Half-wave plate and compensator plate pair 120 is positioned in front of crystal 115. The optical axes of half-wave plate and compensator plate pair 120 are oriented such that orthogonally polarized light beams that are directed through half-wave plate and compensator plate pair 120 are processed to have the same polarization state. If on the other hand, the beams already have the same polarization state, half-wave compensator plate pair 120 does change their polarization state (i.e., the beam passing through the half-wave plate of the half-wave plate and compensator plate pair 120 rotates the polarization of the beam by 90 degrees).

Faraday rotator 125 and electromagnet 130 are positioned adjacent to half-wave compensator plate pair 120. Faraday rotator 125 is constructed from a material that causes a rotation of light beams. The amount of rotation of the beams is a function of the thickness of Faraday rotator 125. In general, the thicker the Faraday rotator, the more rotation that will be imparted on the beams. For example, Faraday rotator 125 can have a thickness that causes a 90°, 180°, or 360° rotation. The rotation caused by Faraday rotator 125 can be increased by the application of an electromagnetic field to the light beam as it passes through the rotator. Thus, when the electromagnetic field is removed (e.g., electromagnet 130 is not powered), Faraday rotator 125 rotates the light beams a first amount to change the polarization. When the electromagnetic field is applied (e.g., electromagnet 130 is activated or powered), Faraday rotator 125 rotates the light beams by a second amount to change the polarization. Alternatively, the field strength of the electromagnetic field may be changed to effectuate a similar result. The electromagnets 130, 131 can be implemented as a single electromagnet.

Referring also to FIG. 3, beam splitter 135 may be a plate type polarizing beam splitter that is in the X-Y plane, and has an axis of incidence. Beam splitter 135 maybe constructed from a material and fabricated such that it transmits a light beam, $L_T$, that is polarized parallel to the axis of incidence and reflects a light beam, $L_R$, that is polarized perpendicular to the axis of incidence. For example, NanoOpto Corporation of Somerset, N.J. makes the Subwave™ Polarization Beam Splitter/Combiner that can be used as beam splitter 135. The NanoOpto Subwave™ Polarization Beam Splitter/Combiner includes subwavelength scale nano-structures that interact with light. The NanoOpto Subwave™ splitter/combiner also has a broad bandwidth, high damage threshold, ease of alignment, high contrast ratios, and low insertion loss.

The switching operation is controlled by applying an electromagnetic field to Faraday rotators 125, 126 so as to change the polarization of the beams. Specifically, switch 100 is operated by activating or powering electromagnets 130, 131 to apply electromagnetic fields to Faraday rotators 125, 126. As a result, the first input light beam carried in input fiber 155 is transmitted through beam splitter 135 to output fiber 161 and the second input light beam carried in input fiber 156 is transmitted through beam splitter 135 to output fiber 160. By removing the electromagnetic field (e.g., deactivating or removing power to electromagnets 130, 131), beam splitter 135 reflects the first input light beam carried in input fiber 155 to output fiber 160 and reflects the second input light beam carried in input fiber 156 to output fiber 161. As such, switch 100 functions as a 2×2 switch to switch the outputs between output fibers 160, 161.

Faraday rotators 125, 126 also can be constructed so as to switch between output fibers based on varying the strength of the electromagnetic fields applied to Faraday rotators 125, 126. For example, Faraday rotators 125, 126 can be configured so as to cause a first input light beam to be transmitted from input fiber 155 to output fiber 161 and a second input light beam from input fiber 156 to output fiber 160 when a first electromagnetic field of a first field strength is applied. Upon a change in the field strength, Faraday rotators 125, 126 then may cause the first input light beam to be transmitted from input fiber 155 to output fiber 160 and the second input light beam from input fiber 156 to output fiber 161.

Faraday rotators 125, 126 also can be constructed so as to switch between output fibers based on applying an electromagnetic field to one Faraday rotator while removing an electromagnetic field from the other. In this manner, the power applied to the device remains constant and changes very little during switching.

FIGS. 4 and 5 illustrate the use of switch 100 to route a first light beam 200 from input fiber 155 to output fiber 160 and a second light beam 201 from input fiber 156 to output fiber 161. In this routing of light beams 200, 201, switch 100 is operated without power applied to electromagnets 130, 131. FIG. 4 illustrates the beams and the components of switch 100 and FIG. 5 illustrates the polarization of the beams after passing through each component of switch 100.

Initially, light beam 200 is coupled from input fiber 155 to port 105 and then directed to lensing element 110, which collimates light beam 200. Light beam 200 then is coupled to crystal 115, which separates light beam 200 into two orthogonal, polarized beams 205, 210. Polarized beams 205, 210 then are coupled to half-wave compensator plate pair 120, which rotates the polarization of one beam by 90 degrees and leaves the other unchanged. In this manner, half-wave compensator plate pair 120 rotates beams 205, 210 such that they have the same polarization state. Beams 205, 210 then are coupled to Faraday rotator 120. In one implementation, the thickness of the Faraday rotator 120 is selected such that when the electromagnetic field is removed (e.g., electromagnet 130 is not powered) there is no effective polarization change (i.e., the beams undergo a 180° change in polarization) of the beams as they pass through Faraday rotator 120. In this manner, the beams have the same polarization. Of course, the thickness of Faraday rotator 120 can be selected such that when an electromagnetic field is applied (e.g., electromagnet 130 is powered) there is a 180° polarization change (i.e., the beams have the same effective polarization) and when the electromagnet field is removed there is a 90° polarization change. Other changes in polarization can be selected based on the thickness of the Faraday rotator and the application of an electromagnetic field.

Beam splitter 135 is oriented such that light beams are reflected when the polarization of the beams is perpendicular to an axis of incidence of beam splitter 135. The configuration of the optical components of switch 100 of FIG. 4 causes beams 205,210 to be perpendicularly polarized relative to the axis of incidence of beam splitter 135 when an electromagnetic field is removed (e.g., power is not supplied to electromagnets 130, 131). In contrast, applying an electromagnetic field (e.g. supplying power to electromagnets 130, 131) rotates the beams 90 degrees such that the polarization of the beams is parallel to the axis of incidence of beam splitter 135. Because the beams are perpendicular to the axis of incidence of beam splitter 135 when the electromagnetic field is removed, beam splitter 135 reflects the polarized beams 205, 210 back to and through Faraday rotator 125. Again, because the electromagnetic field is removed, there is no effective rotation angle change caused by Faraday rotator 125 as the beams pass back through Faraday rotator 125. Beams 205, 210 then are coupled back to half-wave gate and compensator plate pair 120, which does change the rotation angle of one beam such that the beams have different polarizations because both beams had the same polarization (i.e., one beam passes through the half-wave plate and the other beam passes through the compensator plate so that only one beam is rotated by the half-wave plate). Beams 205, 210 next are coupled back to crystal 115, which changes (i.e., separates) the orientation of beams 205, 210 such that they are orthogonally polarized. Orthogonally polarized beams 205, 210 then are coupled to focus lens 110, which combines the two beams into a single, combined beam and focuses the combined beam into the core of output fiber 160.

As noted above with respect to FIG. 1, the same components are placed on each side of beam splitter 135 and, therefore, the same sequence occurs on each side of switch 100. As such, a light beam 201 is coupled through input fiber 156 and is reflected by beam splitter 135 back to output fiber 161.

FIGS. 6 and 7 illustrate the use of switch 100 to route light beam 200 from input fiber 155 to output fiber 161 and light beam 201 from input fiber 156 to output fiber 160. In this routing, an electromagnetic field is applied (e.g., power is applied to electromagnets 130, 131) and light beams 200, 201 are transmitted through beam splitter 135 rather being than reflected by beam splitter 135. FIG. 6 illustrates the beams and the components of switch 100 and FIG. 7 illustrates the polarization of the beams after passing through each component of switch 100. Applying an electromagnetic field (e.g., supplying power to the electromagnets 130, 131) affects the light beams only as they pass through Faraday rotators 125, 126, which rotates the light beams so that they are either transmitted or reflected by beam splitter 135. The light beams are processed in the other optical components in the same manner whether or not an electromagnetic field is applied (e.g., electromagnets 130, 131 are activated).

With an electromagnetic field applied (e.g., power applied to electromagnet 130 at a first level), Faraday rotator 125 rotates the polarization of the light beams by 90 degrees relative to the polarization of the light beams from half-wave plate and compensator plate pair 120. In one implementation, Faraday rotator 125 and beam splitter 135 are oriented relative to each other such that applying an electromagnetic field (e.g., powering electromagnets 130, 131) rotates the light beams by 90 degrees to have a polarization that is substantially parallel to the plane of incidence of beam splitter 135. Again, beam splitter 135 transmits the light beams that have a polarization that is parallel to the plane of incidence of beam splitter 195. Beam splitter 135 is oriented and adjusted such that the beam splitter transmits polarized beams 205, 210 through the beam splitter when the rotation angle change caused by the Faraday rotator is 90 degrees. As such, beams 205, 210 pass from beam splitter 135 to and through Faraday rotator 121. Because an electromagnetic field is applied (e.g., electromagnet 131 is powered), Faraday rotator 121 rotates the polarization angle of the beams by 90 degrees. Beams 205, 210 then pass back through half-wave plate and compensator plate pair 121, which does change the rotation angle of one beam such that the beams have different polarizations because both beams had the same polarization. The beams next pass back through the crystal 116, which changes the orientation of the beams such that they are orthogonally polarized. Orthogonally polarized beams 205, 210 then pass through focus lens 111, which combines the two beams into a combined beam and focuses the combined beam into the core of output fiber 161.

As described above, the same sequence occurs in the "other side" of switch 100. As such, light beam 201 passes through input fiber 156 and is transmitted through beam splitter 135 to output fiber 160.

A number of embodiments of the invention have been described. Nevertheless, it will be understood that various modifications may be made without departing from the spirit and scope of the invention. For example, referring to FIG. 8, switch 100 can be operated as a 1×2 switch if second port 106 includes only output fiber 161 (i.e., input fiber 156 is removed). In this configuration, switch 100 is operated to pass a light beam from input fiber 155 to output fiber 160 when an electromagnetic field is removed (e.g., the electromagnet is unpowered) and to pass a light beam from input fiber 155 to output fiber 161 when an electromagnetic field is applied (e.g., the electromagnet is powered).

The components of switch 100 also can be configured such that applying an electromagnetic field (e.g., activating or powering the electromagnets) rotates the light beams by 90 degrees so that they have a polarization that is perpendicular to the axes of incidence of beam splitter 135. Thus, in contrast to the optical switch of FIGS. 4–7, removing the electromagnetic field (e.g., deactivating the electromagnets) from switch 100 routes light beam 200 from input fiber 155 to output fiber 161 and light beam 201 from input fiber 156 to output fiber 160.

Faraday rotator 125 can have a thickness such that light that passes through Faraday rotator 125 is rotated by 90° when the electromagnetic field is removed (e.g., power is not applied to electromagnet 130) and, for example, 180° when the electromagnetic field is applied (e.g., power is applied to electromagnet 130). In this manner, powering electromagnet 130 causes the polarization of the beams to stay the same. Such an arrangement causes the beams to be oppositely switched when power is deactivated. In another arrangement, multiple Faraday rotators can be placed in series. For example, referring to FIG. 9, two Faraday rotators can be placed in series in a switch. First Faraday rotator 125a has a thickness, $t_1$, and second Faraday rotator 125b has a thickness $t_2$. When power is applied to Faraday rotator 125a, and not applied to Faraday rotator 125b, the total rotation is 90°. When an electromagnetic field is applied to Faraday rotator 125b but not to Faraday rotator 125a, the total rotation is 180° (i.e., the polarization does not change). Faraday rotators 125, 125b also can be arranged such that when an electromagnetic field is applied to both Faraday rotators, there is another rotation, when the electromagnetic field is changed there is yet another rotation, and when the electromagnetic field is removed there is still another, different rotation. Accordingly, other embodiments are within the scope of the following claims.

What is claimed is:

1. A magneto-optical switch comprising:
   a first birefringent crystal configured to receive a light beam;
   a first half-wave plate and compensator plate pair configured to receive split light beams from the birefringent crystal;
   a first Faraday rotator configured to receive the split light beams from the first half-wave plate and compensator plate pair and to change the polarization of a light beam passing through the first Faraday rotator; and
   a beam splitter configured to receive the split light beam from the Faraday rotator, the beam splitter configured to transmit light having a firs polarization and reflect light having a second polarization orthogonal to the first polarization.

2. The magneto-optical switch of claim 1, further comprising a second birefringent crystal, a second half-wave compensator plate pair, and a second Faraday rotator, the second birefringent crystal coupled to the second half-wave compensator plate pair, the second half-wave compensator plate pair coupled to the second Faraday rotator, and the second Faraday rotator coupled to the beam splitter.

3. The magneto-optical switch of claim 1, further comprising a port coupled to the first birefringent crystal and configured to receive optical fibers.

4. The magneto-optical switch of claim 3, further comprising two fibers mounted in the port.

5. The magneto-optical switch of claim 3, further comprising a lensing element configured to receive a light beam from the port, wherein the birefringent crystal receives the light beam from the lensing element.

6. The magneto-optical switch of claim 1, wherein the first birefringent crystal is configured to separate a beam of light into two polarized beams.

7. The magneto-optical switch of claim 1, wherein the first half-wave plate and compensator plate pair is configured to cause the split light beams directed through the first half-wave compensator plate pair to have the same polarization state.

8. The magneto-optical switch of claim 1, wherein the first Faraday rotator is configured to change the polarization state of the split light beams by substantially 90 degrees.

9. The magneto-optical switch of claim 1, wherein the beam splitter includes an axis of incidence and is configured to reflect light beams if the polarization of the light beams is perpendicular to the axis of incidence and transmit light beams if the polarization of the light beams is parallel to the axis of incidence.

10. The magneto-optical switch of claim 1, further comprising an electromagnet coupled to the first Faraday rotator and configured to apply an electromagnetic field to the first Faraday rotator to change a polarization of a light beam directed through the first Faraday rotator.

11. The magneto-optical switch of claim 10, wherein the first Faraday rotator is configured to change the polarization of the light beams to be parallel to an axis of incidence when an electromagnetic field is applied.

12. The magneto-optical switch of claim 10, wherein the first Faraday rotator is configured to change the polarization of the light beams to be perpendicular to an axis of incidence when an electromagnetic field is applied.

13. The magneto-optical switch of claim 10, wherein the beam splitter comprises a parallel plate polarizing beam splitter.

14. The magneto-optical switch of claim 10, further comprising a first port coupled to a first input optical fiber and a first output optical fiber, and a second port coupled to a second input optical fiber and a second output optical fiber, wherein a light beam is directed between the first input optical fiber and the first output optical fiber when the electromagnetic field is applied and between the first input optical fiber and the second output optical fiber when the electromagnetic field is removed.

15. The magneto-optical switch of claim 14, wherein a light beam passes between the second input optical fiber and the second output optical fiber when the electromagnetic field is applied and between the second input optical fiber and the first output optical fiber when the electromagnetic field is removed.

16. The magneto-optical switch of claim 10, further comprising a first port coupled to a first input optical fiber and a first output optical fiber, and a second port coupled to a second input optical fiber and a second output optical fiber, wherein a light beams passes between the first input optical fiber and the first output optical fiber when the electromagnetic field is removed and between the first input optical fiber and the second output optical fiber when the electromagnetic field is applied.

17. The magneto-optical switch of claim 16, wherein the light beam passes between the second input optical fiber and the second output optical fiber when the electromagnetic field is removed and between the second input optical fiber and the first output optical fiber when the electromagnetic field is applied.

18. The magneto-optical switch of claim 10, wherein the first Faraday rotator is configured to change the polarization of the light beams by a first amount when a first electromagnetic field is applied and by a second amount when a second electromagnetic field is applied.

19. A method of switching a pair of light beams between a first output and a second output comprising:
   providing a light beam;
   directing the light beam through a birefringent crystal;

separating the light beam into a first polarized beam and a second polarized beam where the first and second polarized beams have orthogonal polarizations;

changing the polarization of the first polarized beam such that the first and the second polarized beams have a same polarization;

determining whether to switch the first and the second polarized beams to a first output and changing the polarization of the first and second polarized beams to a first polarization if the first and second polarized beams are to be switched;

directing the first and second polarized beams to the first output if the first and second polarized beams have a first polarization; and reflecting the first and second polarized beams to a second output if the first and second polarized beams have a second polarization.

20. The method of claim 19, further comprising applying an electromagnetic field to the first and second polarized beams, wherein applying the electromagnetic field changes a polarization angle of the beams to the first polarization such that the polarization of the beams is parallel to an axis of incidence of a beam splitter.

21. The method of claim 19, further comprising removing an electromagnetic field from the first and second polarized beams, wherein removing the electromagnetic field changes a polarization angle of the first and second polarized beams to the first polarization such that the polarization of the beams is parallel to an axis of incidence of a beam splitter.

22. The method of claim 19, further comprising changing an electromagnetic field applied to the first and second polarized beams from a first field strength to a second field strength, wherein changing the electromagnetic field strength changes a polarization angle of the first and second polarized beams to the first polarization such that the polarization of the beams is parallel to an axis of incidence of a beam splitter.

23. The method of claim 19, further comprising:

changing the polarization of the first and second polarized beams if the optical path of the first and second polarized beams is to be switched;

changing the polarization of the first polarized beam such that the first and second polarized beams have orthogonal polarizations;

directing the first and second polarized beams through a second birefringent crystal.

24. The method of claim 23, further comprising directing the first and second polarized beams from the second birefringent crystal through a lensing element to combine the first and second polarized beams into a combined beam and focus the combined beam into the first output.

25. The method of claim 19, further comprising:

providing a second light beam;

directing the second light beam through a second birefringent crystal;

separating the second light beam into a third polarized beam and a fourth polarized beam where the third and fourth polarized beams have orthogonal polarizations;

changing the polarization of the third polarized beam such that the third and the fourth polarized beams have a same polarization;

determining whether to switch the third and the fourth polarized beams to the second output and changing the polarization of the third and fourth polarized beams to a first polarization if the third and fourth polarized beams are to be switched;

directing the third and fourth polarized beams to the second output if the third and fourth polarized beams have a first polarization; and reflecting the third and fourth polarized beams to the first output if the third and fourth polarized beams have a second polarization.

26. The method of claim 25, further comprising applying a second electromagnetic field, wherein applying the second electromagnetic field changes a polarization angle of the third and fourth polarized beams such that the polarization of the third and fourth polarized beams is parallel to an axis of incidence of a beam splitter, whereby the third and fourth polarized beams are transmitted through the beam splitter.

27. The method of claim 19, wherein reflecting the first and second polarized beams further comprises:

determining that the first and second polarized beams are not to be switched and reflecting the first and second polarized beams towards the second output;

changing the polarization of the first polarized beam such that the first and the second polarized beams have orthogonal polarizations; and directing the first and second polarized beams through the first birefringent crystal.

28. The method of claim 27, further comprising directing the first and second polarized beams through a first focus lens to combine the first and second polarized beams into a second combined beam and focusing the second combined beam into the seconed output.

* * * * *